United States Patent [19]

Crossman

[11] Patent Number: 4,542,809
[45] Date of Patent: Sep. 24, 1985

[54] ELECTRICALLY ACTUATED AIRCRAFT BRAKES

[75] Inventor: Richard L. Crossman, Tallmadge, Ohio

[73] Assignee: Goodyear Aerospace Corporation, Akron, Ohio

[21] Appl. No.: 579,065

[22] Filed: Feb. 10, 1984

Related U.S. Application Data

[60] Continuation-in-part of Ser. No. 347,851, Feb. 11, 1982, Pat. No. 4,432,440, which is a division of Ser. No. 62,199, Jul. 30, 1979, Pat. No. 4,381,049.

[51] Int. Cl.³ .................. F16D 55/02; F16D 55/16
[52] U.S. Cl. ........................ 188/72.8; 74/25; 74/216.3; 74/424.8 R; 188/161
[58] Field of Search ............ 74/424.8 R, 424.7, 112, 74/25, 458, 459, 216.3, 499, 84; 188/72.1–72.9, 161–165, 71.8, 71.9, 196, 216, 71.5, 71.2; 192/70.21, 70.11, 70.16, 106.1, 94, 97, 21.5; 244/111

[56] References Cited

U.S. PATENT DOCUMENTS

| | | | |
|---|---|---|---|
| 4,381,049 | 4/1983 | Crossman | 188/71.9 X |
| 4,392,557 | 7/1983 | Franke | 188/71.9 |
| 4,432,440 | 2/1984 | Crossman | 188/72.8 X |

Primary Examiner—Douglas C. Butler
Attorney, Agent, or Firm—P. E. Milliken; L. A. Germain

[57] ABSTRACT

Apparatus for electrically controlling the application and release of aircraft brakes. In one embodiment, the invention includes a slurry clutch controlling a reciprocating member which is operatively connected to the pressure plate. In another embodiment of the invention, a torque motor is adapted to have an armature which comprises a ball screw, the ball screw being in engagement with a longitudinal drive ring communicating with the pressure plate. Rotation of the armature causes the drive ring to move the pressure plate into forceful engagement with the brake disk stack or to retract the same. In yet another embodiment of the invention, a plurality of torque motors are interconnected with a bull gear which is operative for driving the pressure plate. Each of the embodiments of the invention includes apparatus for maintaining a fixed built-in clearance in the brake disk stack of the brake assembly, and are further adapted for utilization with antiskid systems by utilizing a device communicating with the pressure plate which allows rapid release of brake torque. Additionally, apparatus is provided which allows a locking of the brake assembly while the aircraft is parked.

20 Claims, 12 Drawing Figures

ELECTRICALLY ACTUATED AIRCRAFT BRAKES

This is a continuation-in-part of Ser. No. 347,851 filed Feb. 11, 1982 now U.S. Pat. No. 4,432,440 which is a divisional application of Ser. No. 062,199 filed July 30, 1979 now U.S. Pat. No. 4,381,049.

BACKGROUND OF THE INVENTION

The instant invention resides in the art of braking systems and, more particularly, deals with such systems for aircraft. Present day aircraft utilize a brake disk stack comprised of a plurality of brake disks alternately splined to either a torque tube or the wheel rim. The pressure plate, by actuation of the brakes, forces the disks into frictional contacting engagement with each other to effectuate the braking effort. While the invention herein will be described with respect to such brake assemblies, it will be understood that the apparatus and techniques of the invention are not necessarily limited to such structure.

The invention herein relates specifically to brake assemblies for aircraft wherein actuation of the brake is achieved by electrical and electromechanical control. The embodiments herein will be described with respect to the control mechanisms only and do not elaborate upon the means by which the pilot or user may apply the control signal to the described assembly. It is presented that the art has previously taught a spring-biased brake pedal operating a rheostat or other variable resistive means to generate a signal of amplitude proportional to brake pedal travel and that such signals could be easily adapted for utilization in the embodiments herein. Accordingly, with the cockpit circuitry being readily conceivable and implemented by those skilled in the art, this application is not burdened with discussions relative thereto.

Heretofore in the aircraft industry, it has been found that the greatest percentage of maintenance efforts and repairs are with respect to the hydraulic systems of the aircraft. At this same time, electrical systems have been found to require very little maintenance or repair and to be of a nature which may be quickly and easily tested. Further, while it is complex and costly to provide redundant equipment in hydraulic systems to provide built-in safety factors, redundancy in electrical control circuitry is simple and relatively inexpensive to accomplish. Yet further, hydraulic systems add a great deal of weight to the aircraft, weight which could, if eliminated, allow for the carrying of additional cargo. While hydraulic systems are massive and weighty, electrical systems are substantially less cumbersome and much lighter.

ASPECTS OF THE INVENTION

In light of the foregoing, in accordance with one aspect of the invention, there is provided an electrically actuated aircraft brake wherein no hydraulic system is required.

In accordance with another aspect of the invention, there is provided an electrically actuated aircraft brake which is lightweight, substantially reducing the amount of weight in previously known hydraulic systems.

An additional aspect of the invention is the provision of an electrically actuated aircraft brake which includes apparatus for maintaining a constant built-in clearance between the pressure plate and the disks of the brake disk stack.

Yet another aspect of the invention is the provision of an electrically actuated aircraft brake which is readily adapted for implementation with presently existing braking systems incorporating antiskid circuitry.

Another aspect of the invention is the provision of an electrically actuated aircraft brake utilizing wheel rotation and torque to effectuate brake application.

Still a further aspect of the invention is the provision of an electrically actuated aircraft brake which is simplistic in design, reliable in operation, inexpensive to manufacture, and readily conducive to utilization of redundant circuits to achieve a desired safety factor.

SUMMARY OF THE INVENTION

Certain of the foregoing aspects and other aspects of the invention which will become apparent as the detailed description proceeds are provided by the improvement in a brake assembly having a brake disk stack and a pressure plate in communication therewith, comprising: reciprocating means operatively mounted with respect to the pressure plate for selectively moving the pressure plate into and out of forceful contacting engagement with the brake disk stack; and electrically controlled rotation means operatively interconnected with said reciprocating means, regulated by an operator, for selective control of said reciprocating means and regulation of said forceful contacting engagement.

Other aspects of the invention are presented in a brake control assembly for incorporation with a pressure plate and a brake disk stack comprising: a rotating member operatively connected to a wheel rim and rotatable therewith; a nonrotating member operatively mounted with respect to the pressure plate; a metalized fluid maintained between said members; and electrically actuated coil means for selectively magnetizing said fluid and thereby imparting rotation of said rotating member to said nonrotating member.

Other aspects of the invention are provided by a brake control assembly for incorporation with a pressure plate in a brake disk stack, comprising: an armature; an electric coil rotationally driving said armature; and a drive ring in communication with said armature and pressure plate, wherein energization of said electric coil moves said drive ring to move the pressure plate.

Yet other aspects of the invention are provided by a brake control assembly for reciprocating movement of a pressure plate, comprising: a torque motor; reciprocating means operatively mounted with respect to the pressure plate for effectuating movement thereof; and drive means interconnected between said torque motor and said reciprocating means for driving said reciprocating means.

DESCRIPTION OF DRAWINGS

For a complete understanding of the various aspects of the structures and techniques of the invention, reference should be had to the following detailed description and accompanying drawings wherein.

DETAILED DESCRIPTION OF PREFERRED EMBODIMENTS

Figure 1:
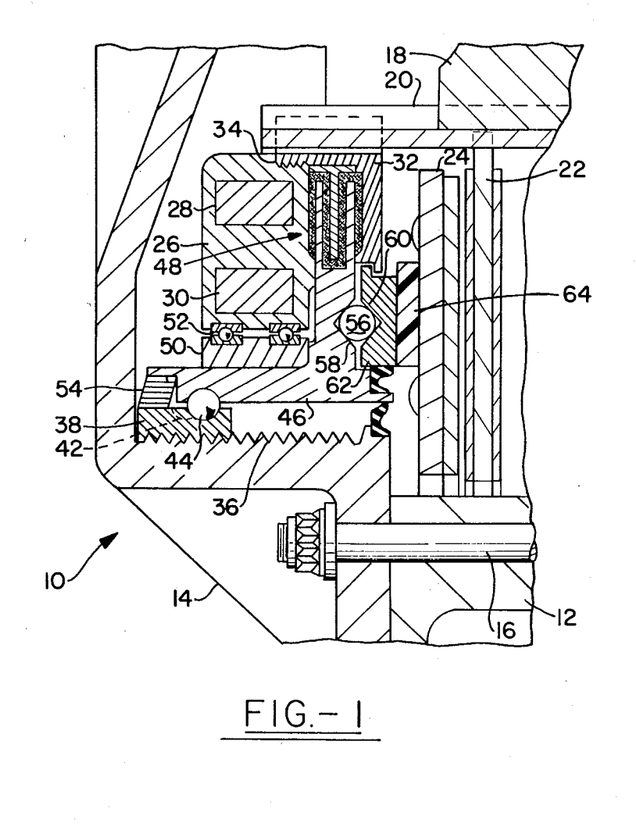
FIG. 1 is a partial sectional view of a brake assembly incorporating a first embodiment of the invention utilizing a slurry clutch.

Referring now to the drawings and more particularly to FIG. 1, it can be seen that a wheel assembly utilizing a first embodiment of the invention is designated generally by the numeral 10. A torque tube 12 is adapted for securing engagement with a brake housing 14 by means of bolts 16 or other fastener interconnected through a bore. It will be understood by those skilled in the art that the torque tube 12 is, in standard fashion, secured by such bolts to the axle of the aircraft wheel such that the structure 12,14 is stationary.

The wheel rim 18, receiving thereon a tire and rotatable about the axle, secures, by means of one or more keys 20, alternating brake disks 22 of a brake disk stack. As is well understood by those skilled in the art, the brake disk stack comprises a plurality of disks alternately splined or keyed to the torque tube 12 and wheel rim 18. There are thus provided alternate rotating and stationary disks in a brake disk stack which are brought into frictional contacting engagement with each other by means of a pressure plate 24.

Included as part and parcel of the invention is a coil housing 26 receiving therein electromagnetic coils 28,30. An end portion or cap 32 is keyed to the rim 18 by the key 20 and is threadedly engaged with the housing 26 as at 34. It will be appreciated that the threaded engagement 34 is for assembly purposes.

A way 36 is provided in the brake housing 14 for purposes which will become apparent hereinafter. A nut 38 is threaded into contacting engagement with the way 36. The nut 38 is characterized by a spiral groove 42 which receives therein a ball screw 44 which is in threaded engagement between the spiral groove 42 of the nut 38 and the clutch member 46. As shown, the clutch member 46 is slidingly received upon the way 36 and is movable thereupon as the ball screw 44 moves within the spiral groove 42.

The clutch member 46 has a flange extending upwardly as shown in the cross-section of FIG. 1 to form two ears receiving therein a center ear or ring depending from the end cap 32. These ears are encompassed by a metalized fluid, impregnated with iron or steel particles to form a slurry clutch designated generally by the numeral 48.

The housing 26 is mounted on a circumferential race member 50 maintained about the way 36. The race member 50 is fixedly secured to the clutch member 46 and provides for rotation of the housing 26 with corresponding rotation of the center ear of the slurry clutch 48 by means of the ball bearings 52. It will be appreciated that a plurality of such ball bearings 52 are provided about the race member 50 and the housing 26 and that such ball bearings are used as a commutator to achieve electrical communication with the coils 28,30. The utilization of the ball bearings 52 as a commutator is more fully discussed in applicant's copending patent application Ser. No. 061,580, filed July 30, 1979, now U.S. Pat. No. 4,237,445. Suffice it to say that the ball bearings 52 allow the housing 26 and central ear of the slurry clutch 38 to rotate with the wheel rim 18 while allowing electrical contact to be made to the coils 28,30.

Interconnecting the clutch member 46 with the nut 38 is a spring 54 which may be a clock type flat coil spring of suitable material. As will be elaborated upon hereinafter, the clock spring 54 is biased to urge the return of the clutch member 46 upon the way 36 for brake release after movement thereof has been achieved via the ball screw 44 within the spiral groove 42 for brake application.

It will also be noted that a spherical thrust bearing 56 is received in circumferential grooves 58,60 respectively characterizing the clutch member 46 and thrust plate 62. Connected to the thrust plate 62 is a suitable insulator 64 which makes contacting engagement with the pressure plate 24.

In operation, the coils 28,30 are energized by a signal passed across the ball bearing commutator 52. The signal may be generated by brake pedal travel controlling a rheostat as discussed earlier herein. The energized coils produce a magnetic field which tends to magnetize the metalized fluid of the slurry clutch 48. Prior to such time, the slurry clutch was free-rotating, but with the magnetization of the fluid a drag builds up between the central rotating ear flange and the outer stationary ear flanges. There is thus created a slight rotation of the clutch member 46 upon the way 36. It will be appreciated that, due to the spiral nature of the groove 42, the clutch member 46 moves both rotationally and longitudinally upon the way 36, forcing the pressure plate 24 into contacting engagement with the brake disk stack via the elements 56-64. In effect, it is wheel rotation and torque achieving the braking effort. This motion winds the clock spring 54 which, at brake release caused by a reduction in signal strength to the coils 28,30, results in slippage of the clutch 48. There is then a corresponding return of the clutch member 46, releasing pressure on the pressure plate. Upon total removal of the brake application signal, the coil 54 brings the ball screw 44 to the starting point of the spiral groove 42, where it remains until the next brake application.

The length of the spiral groove 42 is designed in accordance with the built-in clearance desired between the brake disk stack and the pressure plate. In other words, frictional braking engagement between the disks of the brake disk stack and the pressure plate is achieved at the end of travel of the ball screw 44 within the groove 42. The return of the ball 44 in the groove 42 when brake application is terminated thus reestablishes the built-in clearance. It will be appreciated, however, that as the disks 22 of the brake disk stack wear, there needs to be a new starting point for movement of the clutch member 46 such that constant built-in clearance is maintained. For this reason, the nut 38 is provided. When the ball screw 44 reaches the end of the spiral groove 42, the frictional engagement of the slurry clutch 48 will tend to rotate the nut 38 until braking engagement is made in the brake disk stack. This moves the nut 38 forward such that, on the next brake application, the clutch member 46 has a new starting point, maintaining the same built-in clearance as is characterized by the length of the spiral groove 42. Accordingly, compensation is made for wear in the brake disk stack and optimum use of the disks commensurate with safe operation of the aircraft is achieved.

Figure 2:
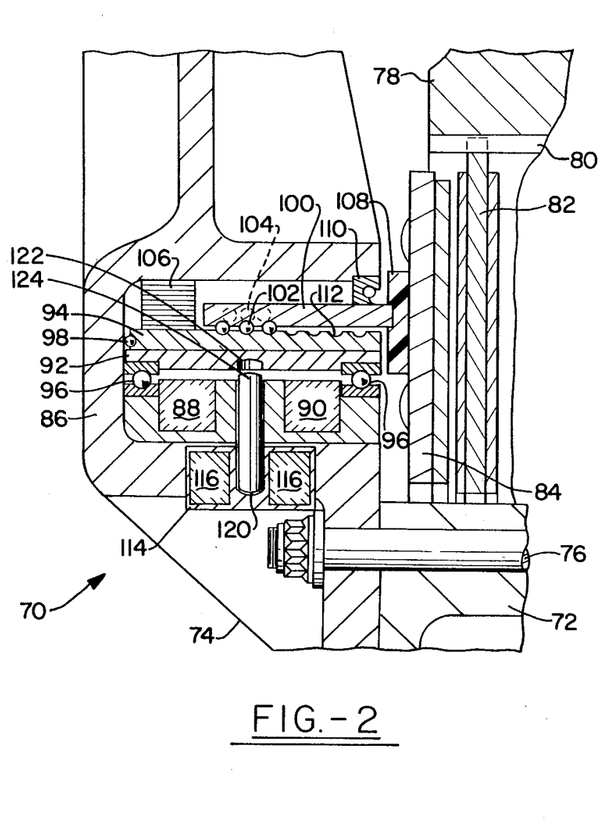
FIG. 2 is a partial sectional view of the brake assembly incorporating a second embodiment of the invention utilizing a torque motor for moving a drive ring.

With reference now to FIG. 2, it can be seen that a wheel assembly utilizing the second embodiment of the invention is designated generally by the numeral 70. Again, a torque tube 72 and brake housing 74 are adapted for interconnection by means of bolts 76. The torque tube 72 is interconnected to the axle of the wheel such that the same is stationary. A wheel rim 78 is provided with brake disks 82 keyed thereto by means of the keys 80, with it being understood that alternate disks are splined or keyed to the torque tube 76. A pressure plate 84 is provided in standard fashion to make the forceful frictional engagement between the various disks of the brake disk stack.

Affixed to the brake housing 74 is a housing 86 maintaining therein coils 88,90 which communicate with a magnet 92. Affixed to the magnet 92 is a ball screw 94, with the magnet 92 and ball screw 94 jointly comprising an armature which is rotatably mounted upon ball bearings 96 and driven by the coils 88,90. A thrust bearing 98 is provided as shown for purposes of keeping the armature 92,94 aligned. It will be appreciated by those skilled in the art that the elements 86-98 comprise a torque motor.

A drive ring 100 communicates via ball bearings 102 with the ball screw 94. The passage 104 is provided in the drive ring 100 to move the last of the three balls from an end groove to the next forward groove in the ball screw 94 as the drive ring 100 moves longitudinally with rotational movement of the armature 98. This extensive longitudinal movement will occur during brake wear adjustment which will be discussed hereinafter.

Interconnected between the brake housing 74 and the armature 92,94 is a return spring 106 which, again, may be of the clock spring nature. The spring 106 is fixedly connected to the housing 74 while being connected by means of a slip joint to the ball screw 94. The slip joint is provided to maintain a built-in clearance while providing for brake wear adjustment. As will become apparent hereinafter, the friction slip joint has ratchet-like teeth thereon sufficient to return the ball screw 94 a distance equivalent to the built-in clearance while slipping beyond that amount. Any travel of the ball screw 94 beyond that returned by the spring 106 is for brake wear adjustment or compensation.

An insulator 108 is provided for interconnection with the drive ring 100 for making contacting engagement with the pressure plate 84 in the manner discussed directly below.

In operation, pilot actuation of the brake pedal provides a signal to the coils 88,90 to energize the same. Energization of these coils rotates the armature 92,94 to cause the drive ring 100 to longitudinally move via the balls 102. This movement forces the pressure plate 84 into the brake disk stack. The spring 106 is then tensioned during the distance of travel of the ball screw 94 equivalent to the built-in clearance. Beyond that movement, the spring 106 slips at the friction slip joint. Movement beyond that point of the drive ring 100 is for brake wear compensation and, during the life of the brake disk stack, the ring 100 will longitudinally move along the ball screw 94 with the balls 102 passing through the passage 104 in the drive ring 100 into subsequently further advanced groove 112. It should also be noted that a guide seal 110 is provided to keep the drive ring 100 suitably aligned and sealed against contamination.

Upon release or reduction of brake pressure, the spring 106 returns the ball screw 94 a distance equivalent to the built-in clearance with the positional relationship between the ball screw 94 and the drive ring 100 being determined by the amount of wear experienced to date in the brake disk stack.

While a spring 106 has been provided with a slip joint to accommodate the built-in clearance, it will be understood by those skilled in the art that a reverse drive via the coils 88,90 of the armature 92,94 for a fixed duration could achieve maintenance of built-in clearance while achieving brake wear adjustment.

Included as part and parcel of the system of FIG. 2 is a parking brake comprising a housing 114 receiving therein a coil 116. The coil cooperates with a plunger 120 to operate as a solenoid. The solenoid plunger 120 has teeth 124 at the end thereof which mesh with teeth 122 provided in the armature 92,94.

In utilization of the parking brake, the pilot actuates the coils 88,90 to bring the pressure plate 84 into forceful frictional contacting engagement with the brake disk stack. At this point in time, the pilot energizes the coil 116 to force the plunger 120 into contacting engagement with the armature 92,94. At this point in time, the teeth 122,124 engage with each other and brake pedal force may be released. With the release of the brake pedal, the coils 88,90 are deenergized and the armature 92,94 attempts to rotate under the urging of the spring 106. However, the interengagement of the teeth 122,124 prevents such rotation and, accordingly, the pressure plate 84 is held into braking engagement with the stack. The coil can, at that time, also be deenergized.

To release the parking brake, the pilot need merely energize the coils 88,90, making a very slightly rotation or urging of the armature 92,94 which releases the clamped engagement of the teeth 122,124 with the plunger 120 thus dropping back to the solenoid housing 114. Release of pedal pressure then allows the retraction of the drive ring 100 a distance equivalent to the built-in clearance.

Figures 3, 4:
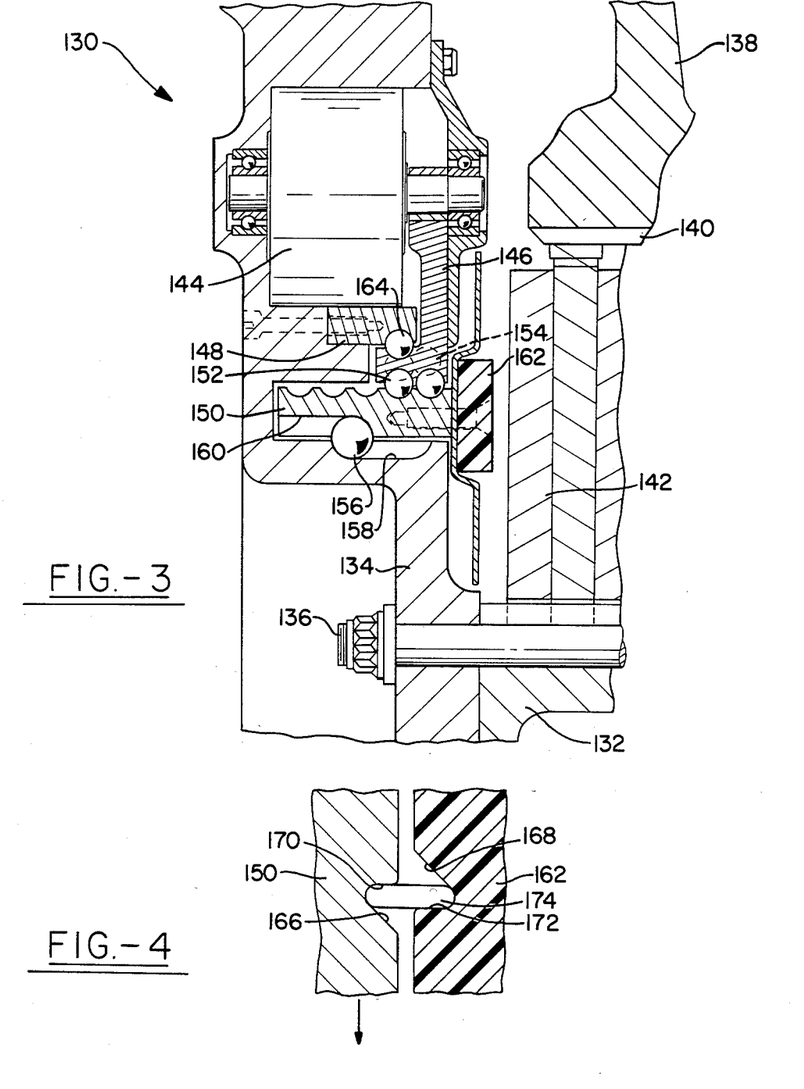
FIG. 3 is a partial sectional view of a brake assembly utilizing a third embodiment of the invention incorporating a plurality of torque motors and a recirculating-ball drive apparatus.
FIG. 4 is a sectional view of a tip-over, quick release mechanism used to achieve near instantaneous relaxation of braking efforts.

As shown in FIG. 3, a wheel assembly utilizing a third embodiment of the invention is designated generally by the numeral 130. Again, a torque tube 132 securedly maintains the brake housing 134 by means of bolts 136. The wheel rim 138 is provided in standard fashion for receipt of the tire, and keys 140 are provided for securing alternate disks of the brake disk stack. The disks of the stack are functional to provide a braking action under forceful engagement imparted by the pressure plate 142.

A plurality of torque motors 144, only one being shown in FIG. 3, are provided in circumferential spaced relationship about the wheel axle. The torque motors 144 are controlled by brake pedal actuation by the pilot, as earlier discussed, to drive a bull or ring gear 146. A thrust ring 148 is provided for maintaining the bull gear in proper alignment.

A ball screw 150 is provided in driven engagement with the bull gear 146 thru a plurality of balls 152 received by the ball screw 150 and intercommunicating with the bull gear 146. A passageway 154 is provided through the bull gear 146 to function as a ball return. It will be noted that the passageway 154 also passes through the thruse ring 148 such that the balls, passing through the passageway 154 act as a thrust bearing. As shown in FIG. 3, the ball 164 is in a thrust bearing position.

An antirotational ball 156 is maintained between the groove 160 of the ball screw 150 and the channel 158 maintained in the brake housing 134. The ball 156 keeps the ball screw 150 from rotating while allowing the same to move longitudinally. As provided in the other embodiments, there is also presented an insulating ring 162 for contacting the pressure plate 142.

In operation, the pilot suitably provides a signal to the torque motors 144 of an amplitude corresponding to the amount of brake pressure to be applied. This signal causes the torque motor 144 to rotate the bull gear 146. As a consequence of this rotation, the ball screw 150 is driven outwardly, driving the pressure plate 142 into contacting engagement with the brake disk stack. As the pilot releases brake pedal pressure, the torque motors 144 reverse their rotational direction accordingly to return the ball screw 150. The reverse drive of the torque motors 144 is limited to an amount equivalent to the built-in clearance and, with the bull gear 146 being freely rotatable, there is provided continual adjustment for brake wear while maintaining a constant built-in clearance.

It is most desirable that the embodiments shown in FIGS. 1–3 be functional for use in aircraft incorporating antiskid systems. Such systems generally require very rapid response times between an electrical signal directing the release of brake application and the actual mechanical release. To achieve the desired instantaneous release, a tip-over quick release is provided as shown in FIG. 4. The structure of FIG. 4 is shown with respect to the embodiment of FIG. 3, but it will be understood that the same is easily adaptable to any of the other embodiments. As shown, the ball screw 150 is characterized by an inclined or ramped surface 166 as is a diametrically opposed area of the insulating ring 162, designated by the numeral 168. Similarly, the ball screw 150 and insulating ring 162 are characterized by respective diametrically opposed surfaces 170,172 which are normal to the face surfaces of the associated elements 150,162. The surfaces 166–172 provide therebetween a receptacle for receiving therein a metal bar 174.

In the operation of the structure of FIG. 4, when the torque motors 144 begin to rotate, there is a very slight rotation of the ball screw 150, notwithstanding the provision of the balls 156. This rotation is in the direction of the arrow as shown in FIG. 4 and forces the bar 174 to take the elongated position as shown, resting against the square sides 170,172, and at square bottom sections of the recesses. Immediately upon release of brake pedal pressure, the ball screw 150 makes a very slight rotation in the direction opposite to the arrow shown, and the bar 174 drops against the ramped or inclined areas 166,168. This dropping allows the insulating ring 162 to instantaneously draw closer to the ball screw 150, with the result being instantaneous release from the brake pressure plate 142. When the torque motors 144 are again energized, the slight rotation of ball screw 150 again brings the metal bar 174 into the position shown in FIG. 4 for immediate reapplication of braking effort.

Figure 5:
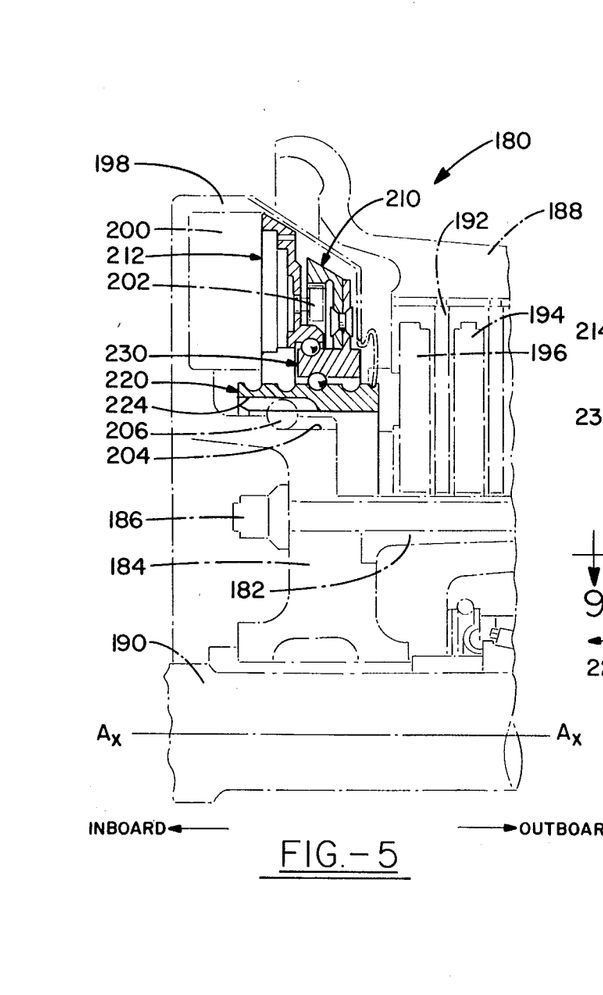
FIG. 5 is a partial sectional view similar to FIG. 3 illustrating another configuration for the recirculating-ball drive apparatus.

Referring now to FIG. 5 of the drawings, a wheel and brake assembly is generally indicated by reference numeral 180, the conventional elements thereof being shown by dot-dashed ghost lines and a specific configuration for a recirculating-ball screw drive apparatus being shown by solid lines and indicated generally by numeral 210.

The conventional elements of the wheel and brake assembly 180 include a torque tube 182 fixedly secured to a brake housing 184 by means of a plurality of bolts 186 and a wheel rim 188 is provided for receipt of a tire (not shown), the wheel 188 being rotatably mounted with respect to a wheel axle 190 centered about an axis indicated by $A_x$. The wheel rim 188 further includes a plurality of drive keys about an inner peripheral edge surface which engage a plurality of brake friction disks 192, the disks being alternate ones of a brake disk stack and rotatable with the wheel 188. The other alternate ones of the disk stack are disks 194 which are keyed about an inner peripheral edge surface to the torque tube 182 and therefore relatively stationary with respect to the disks 192. The friction disks 192 and 194 therefore are functional to provide braking action of the wheel 188 when compressed under forceful engagement imparted by a pressure plate 196 which is positioned at the inboard end of the disk stack. The pressure plate 196 is mounted with respect to a plurality of brake actuators, one of which is indicated at reference numeral 198. Each of the brake actuators 198, in accordance with the description of FIG. 3 of the drawings, comprises a torque motor 200 and these are mounted circumferentially in spaced positions about the $A_x$ axis. The torque motors 200 are also radially removed and axially positioned from the $A_x$ axis and each said motor carries a pinion gear 202 on its shaft at the outboard extent thereof such as to engage and promote operation of the ball screw drive generally indicated at 210. As hereinbefore mentioned, the torque motors 200 are controlled by brake pedal actuation and their interaction with the ball screw apparatus 210 effects compression of the brake disk stack for braking of the wheel 188.

Figure 6:
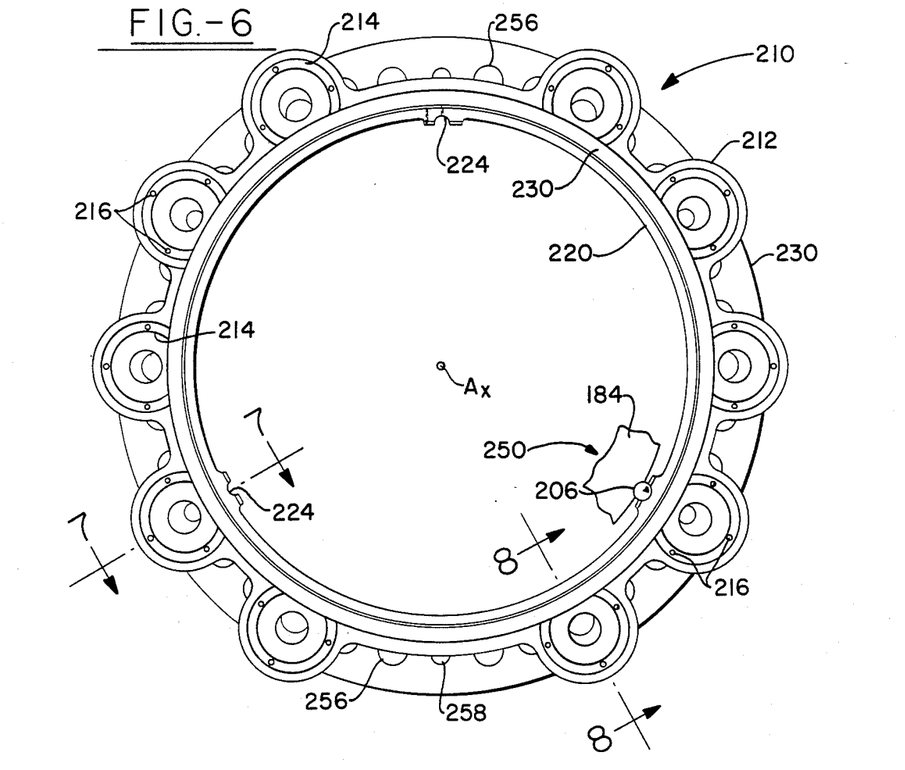
FIG. 6 is a plan view showing the recirculating-ball drive in its entirety as it may be mounted about a wheel axle axis Ax.

FIG. 6 is a plan view of the recirculating ball screw drive apparatus 210 shown assembled as it would be mounted about the $A_x$ axis of the wheel axle 190 and looking to the outboard direction as indicated in FIG. 5. The apparatus 210 generally comprises three annular-shaped members (1) a relatively stationary member 212, (2) a linearly movable member 220, and (3) a relatively rotatable member 230. The linear and rotatable motions of the movable members 220 and 230 respectively are made with reference to the $A_x$ axis.

Figures 7, 8:
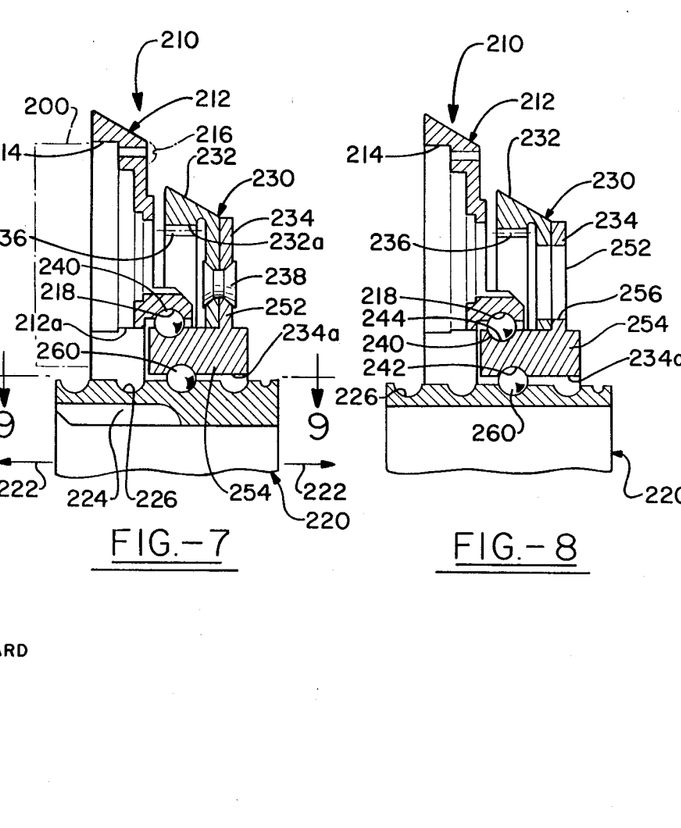
FIG. 7 is an enlarged cross-sectional view as may be taken on line 7—7 of FIG. 6.
FIG. 8 is a cross-sectional view similar to FIG. 7 but taken on line 8—8 of FIG. 6.

It should be apparent from FIG. 6 and further with respect to FIGS. 7 and 8, that the relatively stationary member 212 is in the form of an annular-shaped housing configured to carry the plurality of torque motors 200 within cavities indicated at 214. In contrast to the embodiment shown in FIG. 3, the torque motors 200 are mounted at their outboard ends within the housing member 212 and they are secured within the housing cavities 214 by fasteners 216 which may be any suitable screw or bolt. The housing member 212 is adaptable to mounting varying numbers of torque motors 200, the actual number being dependent upon the particular brake application and the requirements imposed on the brake assembly 180. For example, a housing of the type indicated by reference numeral 212 may be configured to mount as many as 15 or as few as three torque motors 200 and these will, of course, be positioned in a balance arrangement within the housing about the $A_x$ axis. Finally, the member 212 is characterized by a ball race 218 which is machined or otherwise formed within an inside surface of its bore 212a more clearly shown in FIGS. 7 and 8. The ball race 218 is one half of a thrust bearing which carries a plurality of ball bearings 240 and these are mounted within a passageway formed by the race 218 and an opposite race 244 as configured in the rotatable member 230 to be specifically described hereinafter. The operation and purpose of the thrust bearing is the same as for the thrust ring 148 shown in the configuration of FIG. 3.

The second member 220 is a ball-screw or ram similar to member 150 of FIG. 3 and it is mounted in the brake housing 184 so as to move linearly along the $A_x$ axis in the direction of arrows 222 shown in FIG. 7. The ram is restrained from rotational motion about the $A_x$ axis by reason of ball slots 224 which interact with antirotational balls 206 mounted in corresponding slots 204 within the brake housing 184. The arrangement is more clearly shown in FIG. 5 and further via a ghost line showing at one particular position indicated at reference numeral 250 in FIG. 6. While the arrangement 250 is for the purpose of antirotation of the member 220, the slots 204 in the housing 184 may be made wider than the diameter of the balls 206 such that a slight rotation of the member 220 is allowed. This may be done to effect operation of a tip over quick-release mechanism of the type illustrated in FIG. 4 of the drawings if such mechanism is deemed desirable and/or necessary. Finally, the ram member 220 is characterized by a plurality of helical ball grooves 226 which comprise the inner ball race of the ball-screw drive apparatus 210. The grooves 226 have a particular pitch as clearly illustrated in FIG. 9 of the drawings.

The third member of the recirculating ball screw drive apparatus 210 is a rotating member 230 and it comprises, primarily for ease in manufacture, two annular-shaped members 232 and 234 which are postioned inboardly and outboardly respectively on the $A_x$ axis. The inboard member 232 is a bull or ring gear having gear teeth 236 machined within a bore surface 232a. The gear teeth 236 are, or course, adapted to engage the pinion gears 202 of the torque motors 200 in a conventional manner. The inboard member 232 is secured via fasteners 238 to the outboard member 234 and both are rotated as a unit by action of the pinion gears 202 on the ring gear teeth 236. The outboard member 234 is L-shaped in cross-section as evident in FIGS. 7 and 8, a vertical portion 252 being fastened to the ring gear 232 while a horizontal portion 254 comprises the second half of the ball screw drive apparatus by reason of at least one turn of a helical ball groove 242 being machined within the surface of its bore 234a. A plurality of balls 260 are mounted within a passageway defined by the ball groove 226 in the ram member 220 and the ball groove 242 in the portion 234 of the rotatable member 230. Finally, a second ball groove 244 is machined in an outwardly facing surface of the horizontal leg 254 of the portion 234 and this comprises the opposite ball race of the thrust bearing including balls 240 and the race 218 of the relatively stationary member 212 as hereinbefore described with respect to the member 212.

As mentioned, the member 230 is driven into rotational motion by the torque motors 200 acting through the pinion gears 202. However, and because the member 230 has fewer helical ball groove turns 242 than the helical groove turns 226 in the ram member 220, the balls 260 must be recirculated back across at least one turn of the grooves 226. The means for accomplishing ball recirculation are illustrated in FIGS. 10, 11 and 12 of the drawings and this with respect to the configuration of the rotating member 230.

Figure 10:
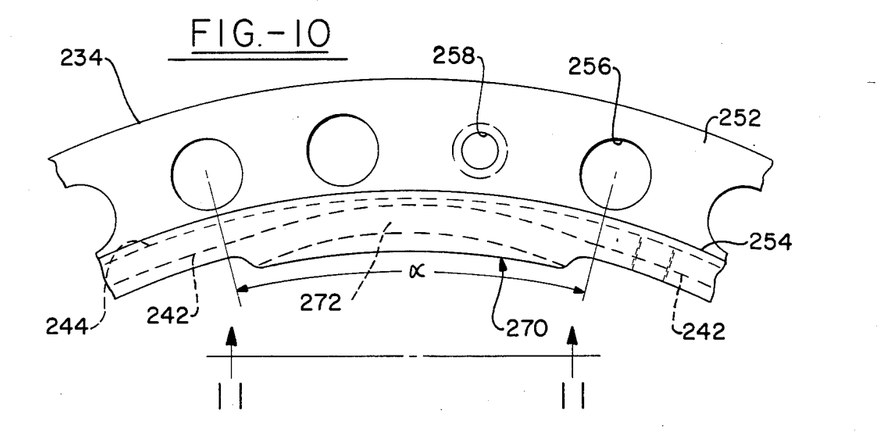
FIG. 10 is a partial elevational view of a middle ball race forming the rotating member in conjunction with a bull or ring gear of the drive apparatus and particularly showing the area of the ball cross-over.

Referring to FIG. 10 of the drawings, an elevational view of the outboard portion 234 of the member 230 is illustrated, the view looking to the outboard direction as established in FIG. 5 and covering a limited arc segment of the annular member in the area of the ball crossover. As mentioned, the member portion 234 comprises a vertical leg 252 and a horizontal leg 254. The vertical leg 252 is characterized by a plurality of apertures 256 which reduce the weight of the member while apertures 258 carry fasteners 238 therein which operate to bind the inboard portion 232 to the outboard portion 234 such as to construct an integral unit structure 230. Of course, it is anticipated that the member 230 may as well be made as a single unitary piece but with attendant manufacturing difficulty and additional cost. In any event, the horizontal leg 254 is configured with a ball cross-over passageway therein, the cross-over being indicated generally by reference numeral 270.

As clearly evident in FIG. 10, the cross-over 270 occupies an arc segment "$\alpha$" within the range of 25–45 degrees and is preferable of approximately 30 degrees and comprises a ball transfer passageway 272 which is not more than one ball diameter in depth and is machined into the parent material of the horizontal leg 254 of the member 234. The machining is accomplished by a spherical milling machine with a shank not exceeding one-half ball diameter and the entire ball race groove 242 and cross-over 270 may be cut in one 360 degree series operation.

Figures 9, 11, 12:
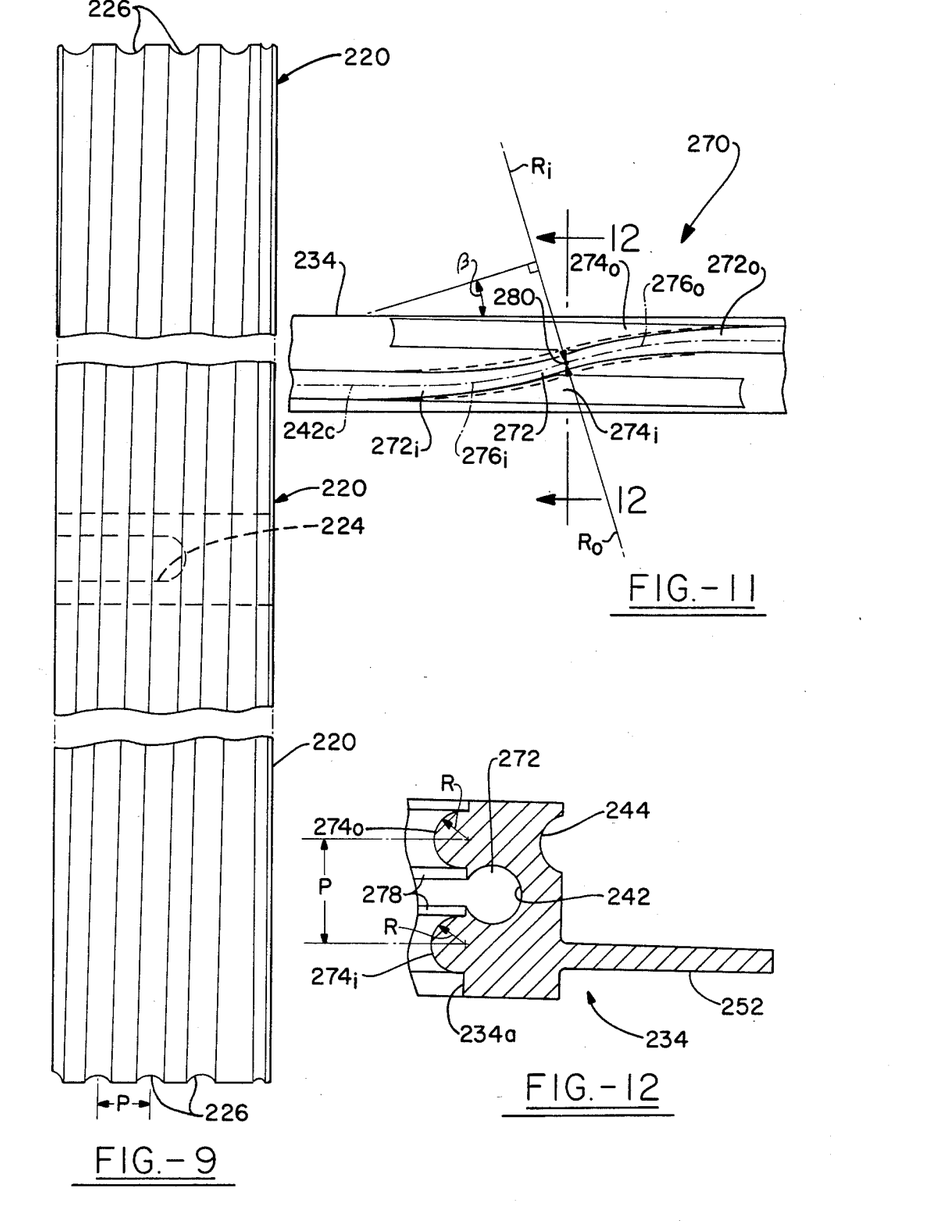
FIG. 9 is a partial plan view of an inner ball race which forms the drive ram of the apparatus, the view being taken on line 9—9 of FIG. 7.
FIG. 11 is a partial plan view of the ball cross-over portion of the middle ball race as taken on line 11-11 of FIG. 10.
FIG. 12 is an enlaraged cross-sectional view of the middle ball race as taken through the center of the ball cross-over on line 12—12 of FIG. 11.

Turning now to FIGS. 11 and 12, the ball cross-over 270 is defined by the helical ball groove 242 that transitions into a ball transfer passageway 272 within the member 234 and within an arc length of less than 45 degrees. The transfer passageway 272 is defined at its input end 272i by an input ball guide 274i and at its output end 272o by an output ball guide 274o. The ball guides 274i, 274o have semicircular cross-sections at the midpoint of the passageway indicated at 280 of a radius "R", have the same pitch "P" as the helical ball grooves 242, and extend for the arc length of the cross-over 270.

More precisely, the cross-over ball transfer passageway 272 is defined at its input 272i by a centerline 276i which is described by a circular arc of radius Ri drawn tangent to the centerline 242c of ball groove 242. Similarly, the ball transfer passageway 272 is defined at its output end 272o by a centerline 276o described by a circular arc of radius Ro which is also drawn tangent to the groove centerline 242c. The two circular arcs 276i, 276o are also tangent to each other at the passageway midpoint 280 and it should be evident therefore that Ri=Ro. The centers of radii Ri and Ro are located on a line at 90 degrees with respect to the passageway centerline at the midpoint 280. According to the foregoing description, the ball transfer passageway 272 is cut into the member 234, from one helical groove 242 to an adjacent groove and at an angle "$\beta$" equal to or less than 15 degrees. Finally, it should now be apparent that since the ball race grooves 242 in the member 234 have the same pitch "P" as the ball guides 274i, 274o and the ball race grooves 226 in the member 220, the two members 220 and 230 are mounted in close nesting relative relationship and this results in a very low-profiled recirculating-ball drive mechanism. Furthermore, this results in an overhang of material 278 shown in FIG. 12 which provides lead-in and lead-out ball guide surfaces through the ball transfer passageway 272.

From the foregoing description, it must be appreciated that the recirculating-ball drive 210 provides a marked improvement in the state of the art. The apparatus provides a very low-profiled unit having a very low friction ball cross-over and which requires not more than one ball diameter depth of cross-over and no more than 90 degrees of arc. Being machined into the parent material of the rotating member 230 there is no requirement for separate and/or additional parts, ball tubes, and the like and the required space to house them. The cross-over ball transfer passageway 272 uses radii of transfer that will allow the use of short ball separators without causing separator race drag or loss of ball position and all of its transfers of direction are tangential. This results in 15 degrees or less in directional change required of the balls traversing the passageway. The overhang 278 of ball passageway 272 serves to keep the balls 260 moving smoothly along completely controlled paths to prevent pile up or zig-zag of ball centerline path of two ball diameters or less.

Finally, and in addition to the above mentioned advantages, the invention contemplates that the ball transfer passageway 272 may be coated with a magnetic material such as to enhance passage of the balls through the passageway. The coating may be applied to the bottom surface of the passageway and along the centerline thereof to lessen any wear that may occur at the ball guide inlet and outlet surfaces and/or of the overhang 278.

Thus it can be seen that there has been presented electrically actuated aircraft brake assemblies which are characterized by the aspects set forth hereinabove. While in accordance with the patent statutes only the best modes and preferred embodiments of the invention have been presented and described in detail, it is to be understood that the invention is not limited thereto or thereby. For an appreciation of the true scope and breadth of the invention, reference should be had to the following claims.

What is claimed is:

1. An improved recirculating-ball screw drive comprising in combination:
   a relatively stationary annular-shaped member having a bore and a ball bearing race groove formed within the bore;
   an annular-shaped ram member mounted within the bore of the stationary member and adapted for axial linear motion through the bore, said ram member having a plurality of helical ball race grooves of a particular pitch within an outwardly facing annular surface thereof; and
   a relatively rotatable annular-shaped member mounted coaxially between the relatively stationary and ram members and having a ball bearing race groove in an outwardly facing annular surface in relative alignment with the ball race groove in the stationary member, said two races and a plurality of ball bearings carried between them forming a thrust bearing to maintain the relative positions of the two members, said rotatable member further comprising a plurality of gear teeth about a peripheral edge surface adapted for driving the member into rotation and at least one helical ball groove turn formed within its bore of the same pitch as the ball race grooves formed in the outer facing surface of the ram member, said ball grooves and a plurality of ball bearings carried therebetween forming a ball-screw drive of the ram member upon rotation of the rotatable member, said balls being recirculated back through a ball transfer passageway formed within the bore of the rotatable member to effect continued ball-screw drive motion of the linearly moving ram member.

2. The improved recirculating-ball screw drive as set forth in claim 1 wherein the ball transfer passageway is machined within the bore of the rotatable member and is not more than one ball diameter in depth.

3. The improved recirculating-ball screw drive as set forth in claim 1 wherein the ball transfer passageway is defined by inlet and outlet centerline arcs which are drawn tangent to a centerline established for the helical ball grooves.

4. The improved recirculating-ball screw drive as set forth in claim 3 wherein the inlet and outlet centerline arcs are defined by radii having centers located at opposite ends respectively of a line drawn through a midpoint of the ball transfer passageway.

5. The improved recirculating-ball screw drive as set forth in claim 4 wherein the radius of arc of the centerline at the input is equal to the radius of arc of the centerline at the output and the arcs are tangent at the midpoint of the ball transfer passageway.

6. The improved recirculating-ball screw drive as set forth in claim 1 wherein the ball transfer passageway crosses over from one ball groove to another at an angle of not more than 15 degrees.

7. The improved recirculating-ball screw drive as set forth in claim 1 wherein the ball transfer passageway is within an arc length of not more than 45 degrees within the bore of the rotatable member.

8. The improved recirculating-ball screw drive as set forth in claim 7 wherein the ball transfer passageway is within an arc length which is within the range of 20–40 degrees.

9. The improved recirculating-ball screw drive as set forth in claim 8 wherein the ball transfer passageway is within an arc length of 30 degrees.

10. The recirculating-ball screw drive as set forth in claim 1 wherein the ball transfer passageway is magnetic such as to attract balls traversing the passageway to the bottom surface thereof.

11. In a brake assembly comprising a brake disk stack and a pressure plate in communication with the stack, the improvement comprising:
   a recirculating-ball screw drive operatively positioned with respect to the pressure plate comprising
   (a) a relatively stationary annular-shaped member having a bore and a ball bearing race formed within its bore;
   (b) an annular-shaped ram member mounted within the bore of the stationary member and adapted for axial linear motion therethrough for effecting contacting engagement with the pressure plate, said ram having a plurality of helical ball grooves of a particular pitch about an outwardly facing surface thereof; and (c) a relatively rotatable annular-shaped member mounted coaxially between the relatively stationary and ram members and having a ball bearing race formed in an outwardly facing surface and in relative position to the ball race within the bore of the stationary member, the two races and a plurality of ball bearings carried between them forming a thrust bearing as between the two members, said rotatable member further comprising a plurality of ring gear teeth about a peripheral edge surface thereof and at least one helical ball groove turn formed within its bore of the same pitch as the ball grooves in the ram member, said ball grooves carrying a plurality of balls therebetween to drive the ram member upon rotation of the rotatable member, said balls being recirculated through a ball transfer passageway formed within the bore of the rotatable member to effect continued ball-screw drive motion of the linearly moving ram member; and a plurality of torque motors mounted within the relatively stationary member, each said motor carrying a pinion gear operatively engageable with the ring gear of the relatively rotatable member, said torque motors regulated by an operator for selectively moving the ram into and out of forceful contacting engagement with the pressure plate.

12. The improvement as set forth in claim 11 wherein the ball transfer passageway is machined within the bore of the rotatable member and is not more than one ball diameter in depth.

13. The improvement as set forth in claim 11 wherein the ball transfer passageway is defined by inlet and outlet centerline arcs which are drawn tangent to a centerline established for the helical ball grooves.

14. The improvement as set forth in claim 13 wherein the inlet and outlet centerline arcs are defined by radii having centers located at opposite ends respectively of a line drawn through a midpoint of the ball transfer passageway 15. The improvement as set forth in claim 14 wherein the radius of arc of the centerline at the input is equal to the radius of the arc of the centerline at the output and the arcs are tangent at the midpoint of the ball transfer passageway.

16. The improvement as set forth in claim 11 wherein the angle of the ball transfer passageway between the two adjacent ball grooves is not more than 15 degrees.

17. The improvement as set forth in claim 11 wherein the ball transfer passageway covers no more than 45 degrees of arc length within the bore of the member.

18. The improvement as set forth in claim 17 wherein the ball transfer passageway is within the range of 20-40 degrees of arc length.

19. The improvement as set forth in claim 18 wherein the ball transfer passageway is within an arc length of 30 degrees.

20. The improvement as set forth in claim 11 wherein the ball transfer passageway is magnetic such as to attract balls traversing the passageway to the bottom surface thereof.

* * * * *